United States Patent [19]

Jarvis

[11] Patent Number: 4,611,635
[45] Date of Patent: Sep. 16, 1986

[54] COATED PIPE HAVING BENDING CAPABILITY

[75] Inventor: Harold F. Jarvis, Moffat, Canada

[73] Assignee: Shaw Industries Ltd., Rexdale, Canada

[21] Appl. No.: 698,146

[22] Filed: Feb. 4, 1985

[30] Foreign Application Priority Data

Feb. 22, 1984 [CA] Canada .................................. 447994

[51] Int. Cl.⁴ ............................................... F16L 9/16
[52] U.S. Cl. ..................................... 138/146; 138/175
[58] Field of Search .............. 138/146, 175, 153, 154, 138/150, DIG. 5, 141, 129, 145; 29/456, 527.2; 264/285, 286

[56] References Cited

U.S. PATENT DOCUMENTS

| | | | |
|---|---|---|---|
| 1,961,974 | 6/1934 | Kraner | 138/175 |
| 3,761,557 | 9/1973 | Werner | 138/175 |
| 3,799,208 | 3/1974 | Ells | 138/175 |
| 3,955,600 | 5/1976 | Tamburello | 138/175 |
| 4,112,565 | 9/1978 | Sailas | 138/150 |
| 4,134,197 | 1/1979 | Nijs et al. | 138/175 |
| 4,437,495 | 3/1984 | Zonsveld | 138/146 |

FOREIGN PATENT DOCUMENTS 959744 12/1974 Canada .

OTHER PUBLICATIONS

Advances in Concrete Coating of Submarine Pipelines, E. G. Kiernan and F. E. Blake.

Primary Examiner—Stephen Marcus
Assistant Examiner—Leo J. Peters
Attorney, Agent, or Firm—Ridout & Maybee

[57] ABSTRACT

In a concrete-wrapped pipe having an inner water-impermeable resinous coating, the concrete wrapping is formed with a continuous inner portion covering the resinous coating and a helically slotted outer portion forming a helical wrap, the helical slot extending at least to the depth of a mesh reinforcement embedded in the concrete. The concrete wrapping serves as a water-permeable impact resistant barrier while permitting limited bending of the pipe.

10 Claims, 11 Drawing Figures

COATED PIPE HAVING BENDING CAPABILITY

This invention relates to metal pipes, more particularly metal pipes used in pipeline applications.

Pipes to be installed in pipelines are commonly coated with a corrosion barrier layer, for example a thin resinous layer which is bonded to the pipe surface and, so long as it remains intact, serves as a water barrier to protect the pipe against corrosion, although in practice it is usual to provide further protection against corrosion by a system of cathodic protection. In the installation of a pipeline both the pipe and the thin resinous layer are susceptible to mechanical damage caused by impact of rocks during lowering and backfilling, and denting by rocks due to high static loading during hydrostatic testing operations. To prevent such damage there is a great need in the pipeline industry for a protective coating which will absorb impact and penetration likely to cause damage. Currently available materials which are used on a small scale for this purpose include particle board, which can withstand impact up to about 60 Joules, and fibre-reinforced cement, which can withstand impact up to about 20 Joules. However, these materials are not suitable for pipeline applications in rocky terrain where much greater mechanical protection is required.

One of the difficulties in making a suitable selection from the available materials is that the material must not only have the requisite impact and penetration resistance but must also have sufficient flexibility to accommodate bending of the pipe up to a certain amount typically 1.5° per pipe diameter permanent deflection.

In order to avoid damage to the pipe, as well as the coating, from rocks, particularly where a pipe is to be buried in a rocky terrain, the common practice is to truck sand from other areas and to embed the pipe in the sand at a level elevated from the rocky base. This is a very costly procedure which could be obviated if a suitable coating for the pipe were available.

The present invention provides such a coating, which is essentially a water-permeable layer of impact-resistant and penetration-resistant cladding material, typically having an elongation not exceeding 2.2%, but structured in such a way as to accommodate limited bending of the pipe.

The cladding material may be concrete, but other materials having the requisite impact resistance, penetration resistance and permeability to water may also be used. The relevant criteria of such a material for use in pipeline applications are as follows:

| | |
|---|---|
| Minimum Compressive Strength | 10 MPa |
| Maximum Elongation | 2.2% |
| Minimum Impact Resistance (measured with a 25 mm diameter tup with a 10 Kg weight) | 450 Joules |
| Minimum Penetration Resistance (measured with a 25 mm diameter blunt rod) | 2500 Kg |

The volume resistivity of the material when saturated with water should be less than five times the volume resistivity of water, and freeze-thaw cycling should have no effect.

Concrete-coated metal pipes are well known in the art. Canadian Pat. Nos. 959744 and 1076343 relate to methods and apparatus for applying concrete coatings to pipes. These coatings are usually applied to pipes intended for offshore installations where weight and negative buoyancy are the major considerations, but are generally unsuitable for inland installations owing to the rigidity of the product and therefore its inability to accommodate bending of the pipe as it is laid. The present invention provides a protective coating which does not have these limitations and which is especially suitable for inland pipeline installations.

According to one aspect of the present invention there is provided a metal pipe having a protective coating consisting essentially of an inner, water-impermeable, corrosion barrier layer bonded to the pipe surface and an outer, water-permeable layer of impact-resistant and penetration-resistant cladding material having an elongation not exceeding 2.2%, said cladding material having a layer of mesh reinforcing material embedded therein, said outer layer comprising a continuous inner portion covering the corrosion barrier layer and an outer portion which is helically slotted substantially to the depth of said reinforcing layer, the slot having axially offset inner and outer regions thereby defining a helical wrap in which adjacent convolutions overlap, said adjacent overlapping convolutions being articulately interconnected so permitting limited bending of the pipe.

According to another aspect of the present invention there is provided a metal pipe having a protective coating consisting essentially of an inner, water-impermeable corrosion barrier layer bonded to the pipe surface and an outer, water-permeable, concrete layer having a reinforcing layer of mesh reinforcing material embedded therein, said concrete layer comprising a continuous inner portion covering the corrosion barrier layer and an outer portion which is helically slotted substantially to the depth of the reinforcing layer, the slot having axially offset inner and outer regions thereby defining an outer helical wrap in which adjacent convolutions overlap and are articulately interconnected so permitting limited bending of the pipe.

The concrete layer is preferably formed as a continuous strip of concrete incorporating the mesh reinforcing material and having complementary rebated edges defining laterally offset inner and outer strip portions, the strip being wrapped helically onto the pipe with the rebated edges of adjacent convolutions merging to form the continuous inner portion of the concrete layer and the outer strip portions of the adjacent convolutions being separated to define the helical slot in the outer portion of the concrete layer. In a preferred method of applying the coating, the concrete strip is supported on a carrier tape which is fed to the pipe under tension and helically wrapped around the pipe so as to compress the concrete on it. The tape is of such a width as to extend beyond one rebated edge of the concrete strip and, beyond under controlled tension, curls over said one rebated edge thus separating the outer strip portions of the adjacent convolutions. In the finished product that edge of the tape extends into the helical slot so formed.

The concrete layer may be of high density concrete, but for inland installations it is preferably of lightweight concrete for convenience of shipping and handling of the coated pipe sections.

A preferred embodiment of the invention will now be described, by way of example, with reference to the accompanying drawings, in which:

FIG. 1A is a section on line A—A in FIG. 1;

FIG. 1B is a section on line B—B in FIG. 1;

The method and apparatus illustrated in FIGS. 1-5, for applying the concrete layer to the pipe, are basically as disclosed in our co-pending Canadian patent application Ser. No. 435,502 dated Aug. 26, 1983, corresponding to U.S. Pat. No. 4,544,426, and will be described hereinafter. First, however, it will be appropriate to consider the structure of the coated product.

Figure 6:
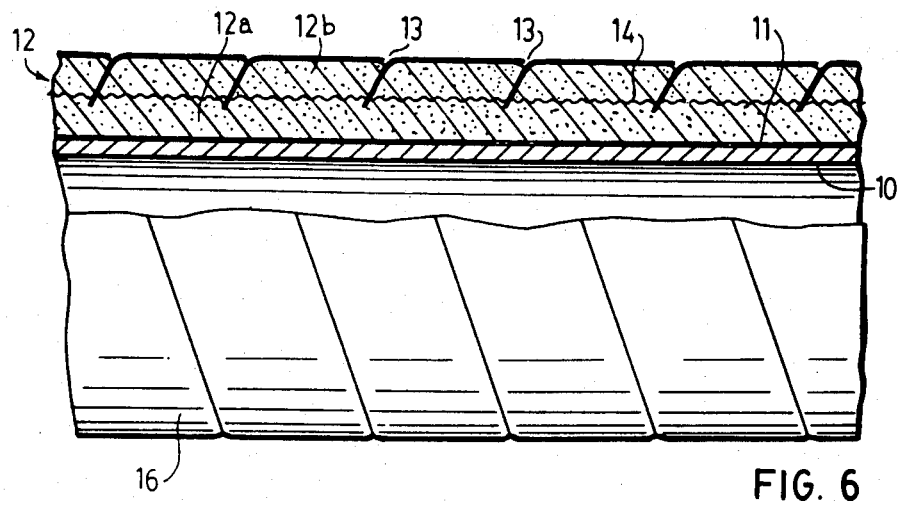
FIG. 6 is a half-sectional side elevation of a pipe having a protective coating according to the invention.

Referring to FIG. 6, a steel pipe 10 for installation in a pipeline has a water-impermeable corrosion barrier layer 11 bonded to and covering its outer surface. The coating 11 of the present example is preferably a layer of epoxy resin which is fusion bonded to the pipe surface, and which may be applied for example by the method described in our Canadian Pat. No. 965652 dated April 8, 1975. In a typical case the pipe may have a wall thickness of 0.2-0.7 inch, the epoxy resin layer being 0.008-0.030 inch. The epoxy coated pipe is encased within a layer of mesh reinforced lightweight concrete 12, from 1-3 inches thick, forming an impact-resistant outer layer which is permeable to water so as not to shield the cathodic protection of the pipe. The composition of the concrete may be as follows:

|  | Parts by Weight | |
|---|---|---|
|  | Acceptable by Range | Preferred |
| Lightweight Aggregate (Expanded Slag or Fly Ash) | 70-120 | 90 |
| Sand (#13) | 0-30 | 10 |
| Pigment | 0-8 | 4 |
| Portland Cement | 25-45 | 35 |
| Water | 8-16 | 13.5 |

Figure 8:
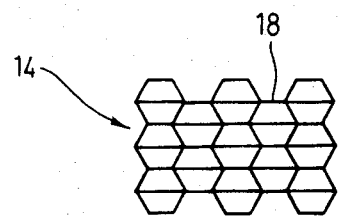
FIG. 8 shows a detail of the mesh reinforcing material.

The concrete layer 12 may be considered to comprise a continuous inner portion 12a, of about half the total thickness of the layer, which covers the epoxy layer 11, and a helically slotted outer portion 12b, in which the helical slot 13 which defines the convolutions of the helix extends substantially to the depth of a reinforcing layer 14. The reinforcing layer 14 consists of a strip of fibrous or wire reinforcing material, of slightly smaller width than the width of the convolutions of the helical outer concrete portion 12b, and wound helically so as to lie embedded in the concrete layer. FIG. 8 illustrates a detail of the mesh, which in the present example is an 18 gauge wire mesh having 1½ inch hexagonal openings bisected by longitudinally extending wires 15. The wires 15 serve to reduce necking of the mesh when it is subjected to tension during application of the concrete. The helical slot 13, as previously mentioned extends into the concrete layer substantially to the depth of the reinforcing layer 14, and may extend between the turns of the mesh reinforcement to a little beyond them. The critical consideration is that the slot 13 must not extend to a depth at which it will establish a line of weakness in the inner portion of the concrete layer as this could cause the concrete to crack along the line of weakness. On the other hand, if the slot has insufficient depth the coated product will be too rigid. It is found in practice that the slot should extend to about the depth of the reinforcing layer so as to achieve the required flexibility without cracking the concrete. It will be seen in FIG. 6 that the helical slot 13 is angled, that is to say it has axially offset inner and outer regions, so that the turns of the outer portion 12b of the concrete layer are interleaved thus shielding the concrete within the slots from direct impact by external objects.

Figure 7:
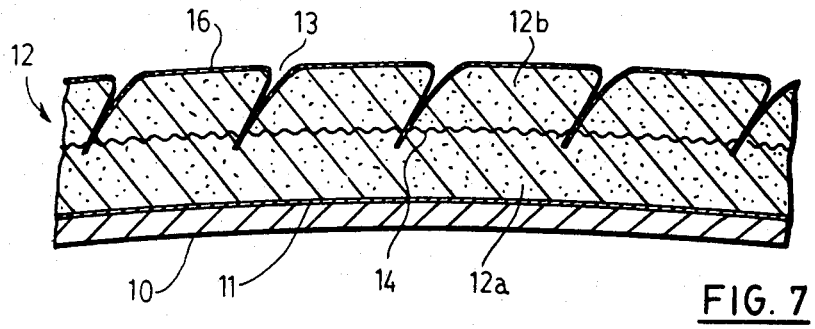
FIG. 7 shows a detail of FIG. 6 in which the pipe is subjected to a bending load.

As described with reference to FIGS. 1-5, the concrete layer 12 is applied to the pipe by being fed to it as a strip supported on a carrier tape and wrapped helically onto the pipe. Portions of the carrier tape 16 are shown in FIGS. 6 and 7, wherein one longitudinal edge of the carrier tape extends beyond the corresponding edge of the wrapped outer concrete portion 12b and into the slot 13, thus serving to separate the adjacent convolutions of the outer wrap. The carrier tape 16, which is perforated by a prick wheel when it has been wrapped onto the pipe, is typically a 0.010 inch polyethylene tape incorporating an elasticizer, preferably "EVA". This outer tape wrap may become worn and torn during handling of the finished product, but that is of no consequence since its essential function was to separate the turns of the concrete outer portion 12b during application to the pipe and during setting of the concrete so that the turns would remain discrete in the finished product.

The finished product is therefore a steel pipe 10 having a protective coating consisting of an inner, water-impermeable, corrosion barrier layer 11 bonded to the surface of the pipe, and an outer, water-permeable, concrete layer 12, in the present case a lightweight concrete layer, having a reinforcing layer 14 of mesh reinforcing material embedded therein. The concrete layer 12 comprises a continuous inner portion 12a covering the resinous layer 11 and an outer portion 12b which is helically slotted, as shown at 13, thereby defining an outer helical wrap in which the adjacent discrete convolutions are articulately interconnected by the inner concrete portion 12a.

This construction, instead of being quite rigid as is normally the case with concrete coated pipe, has a degree of flexibility and permits a limited amount of bending of the pipe so that the pipe can accommodate to irregularities and undulations on the ground or in the trench where it is to be installed, while being adequately protected from damage by rock edges or the like. As shown in FIG. 7, the effect of bending is to open out the convolutions of the outer wrap on one side of the pipe, up to a limit determined by the closing in of the convolutions on the opposite side of the pipe.

The method of applying the concrete layer to the pipe will now be described, the resinous layer having already been applied to the pipe surface in the manner described in Canadian Pat. No. 965652.

Figure 1:
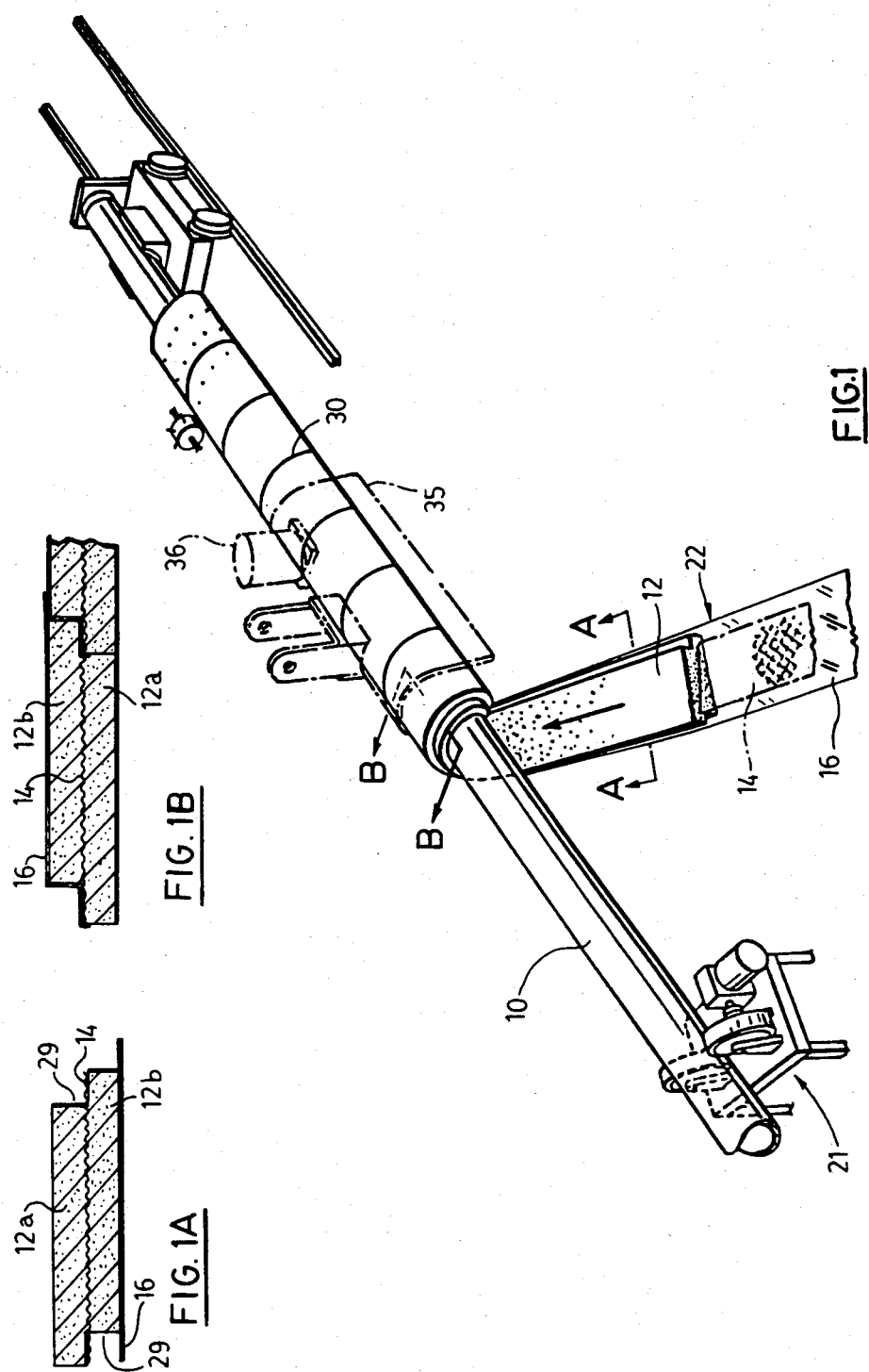
FIG. 1 is a perspective view of a pipe being wrapped in accordance with a method of the invention.

Referring to FIG. 1, the pipe 10 is conveyed and rotated by conventional conveyor means 21, and the pipe is wrapped helically with a strip 22 of coating material advanced at an angle thereto also in a conventional fashion. The strip 22 comprises the polyethylene carrier tape 16 upon which is applied a layer of lightweight concrete 12 having the composition previously described, and having at least one continuous strip of reinforcement 14 embedded therein. The reinforcement 14 is in fact a strip of wire mesh 14 whose structure is illustrated in FIG. 8. The concrete 12 has a lower water content so that it will set rapidly and have low plasticity. As illustrated in FIGS. 1A and 1B, the strip of concrete 12 comprises a pair of laterally offset inner and outer portions 12a, 12b, by virtue of complementary notches 29 formed along both edges of the concrete strip. The wrapping strip 22 can be wrapped uniformly about the pipe 10 in a fashion superior to that previously available by reason of the notches 29 so that, upon wrapping, the strip 22 overlaps with itself at a helical seam to ensure evenness of coating. The inner portions 12a of the concrete strip merge together and subsequently set to form the continuous inner portion of the concrete layer covering the resinous layer. However, one longitudinal edge of the carrier tape 16 is uncoated, that is, it extends beyond the corresponding edge of the applied concrete layer. In wrapping the pipe 10 the carrier tape 16 is tensioned longitudinally so that, by reason of the elasticity of the carrier tape, its uncoated edge curls over the adjacent edge of the concrete strip 12, thus forming an insert which extends down between adjacent turns of the outer concrete portions 12b. In this way the adjacent turns of the outer concrete portion are prevented from merging together but remain discrete so as to form a helical slot in the finished product, the inner region of the slot being axially offset from its outer region. The width of the uncoated portion of the carrier tape 16 is such that the insert will extend substantially to the depth of the reinforcing mesh 14.

As may also be seen from FIG. 1, the wrapped pipe is coated with a shoe 35 having a vibrator 36 which operates to smooth, compact and increase the density of the coating material and to cause an intermingling of the applied concrete 12 at the helical seam 30. The shoe 35 is preferably made of steel and is curved to conform to the outside diameter of the wrapped pipe. However, each shoe 35 may be used over a range of diameters so a large number of shoes 35 are not required in order to cover a wide range of wrapping applications.

A low coefficient of friction is maintained between the contacting surfaces of the wrapped pipe and the shoe 35 by virtue of the vibration of the shoe 35 and optionally by applying a light spray of water to the exterior of the wrapped pipe.

Figure 2:
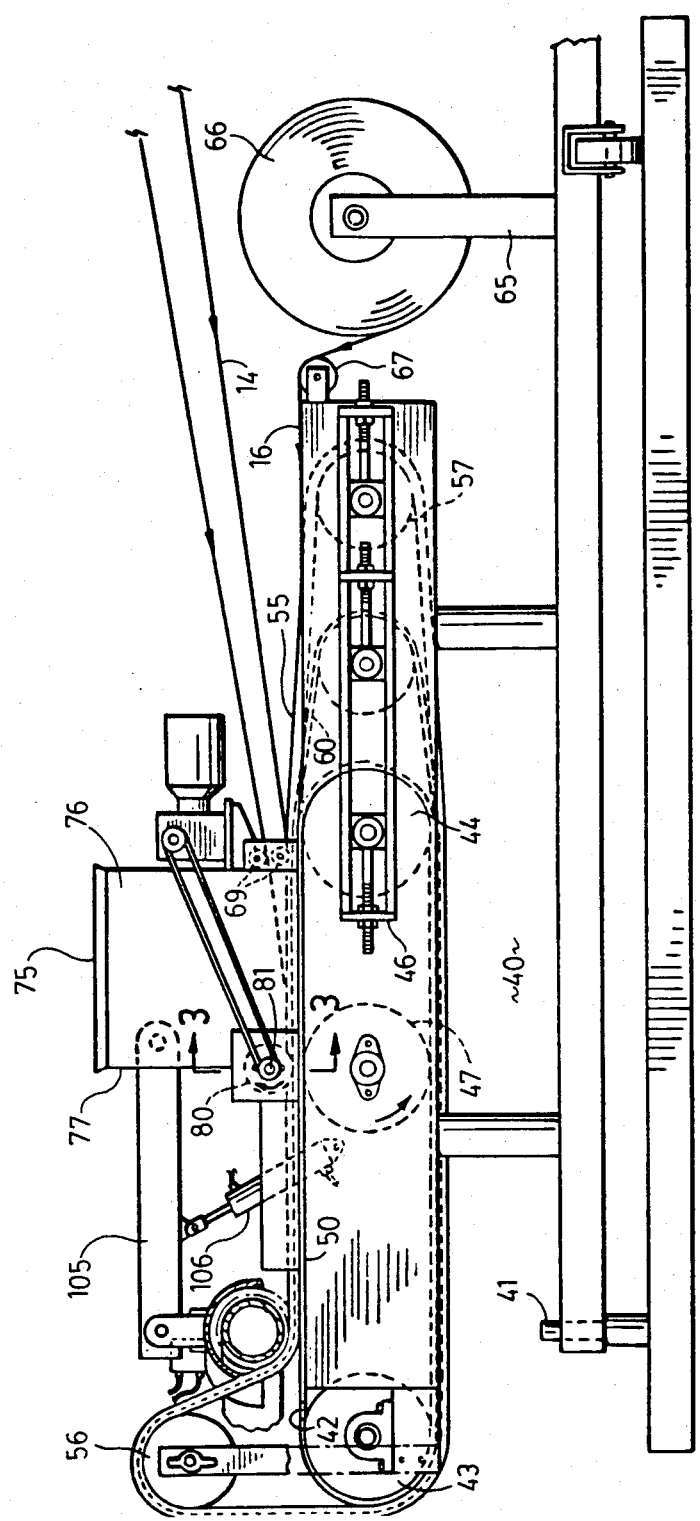
FIG. 2 is a side elevational view of an apparatus used to apply the concrete coating layer to the pipe.
Figure 4:
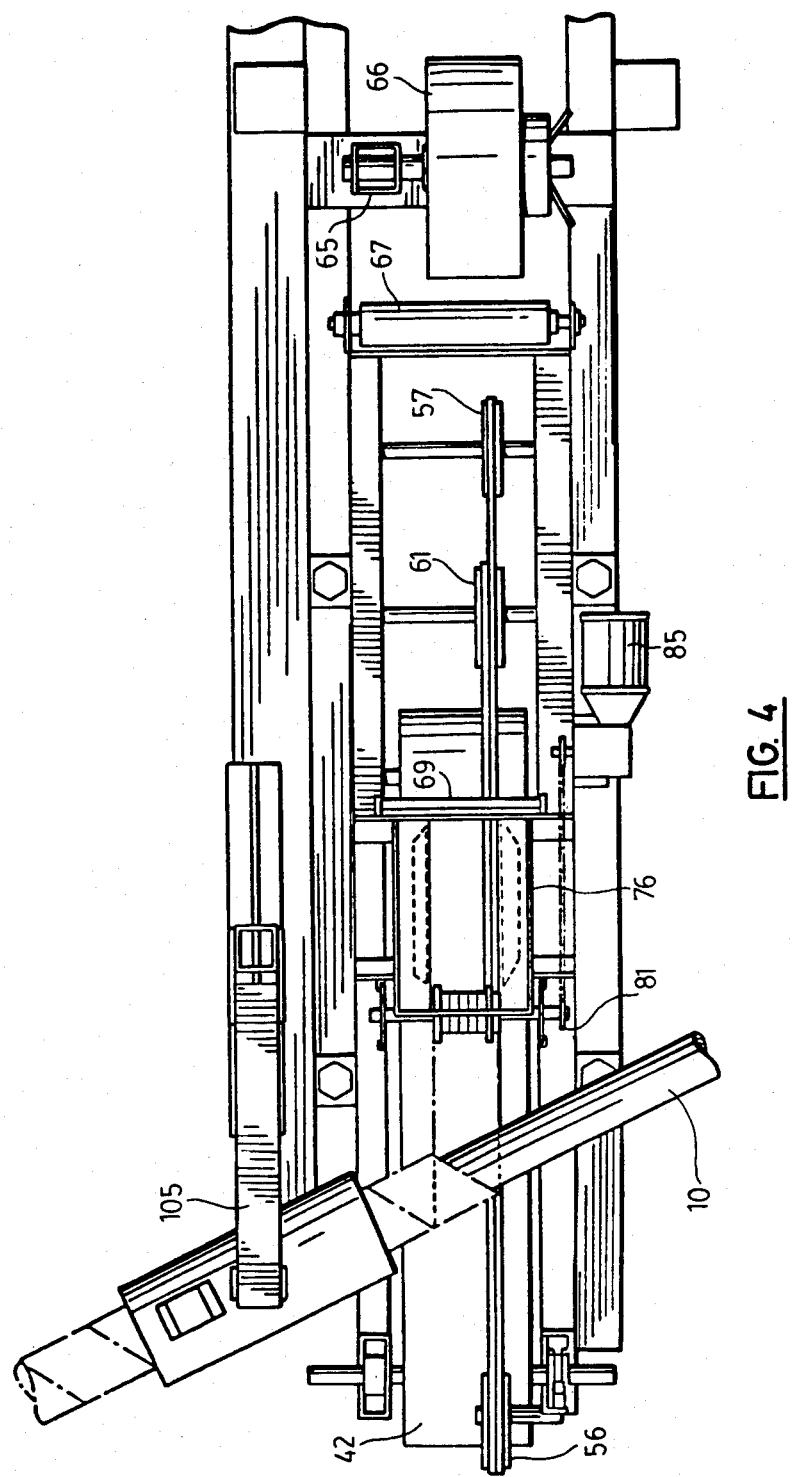
FIG. 4 is a top plan view of the apparatus.
Figure 5:
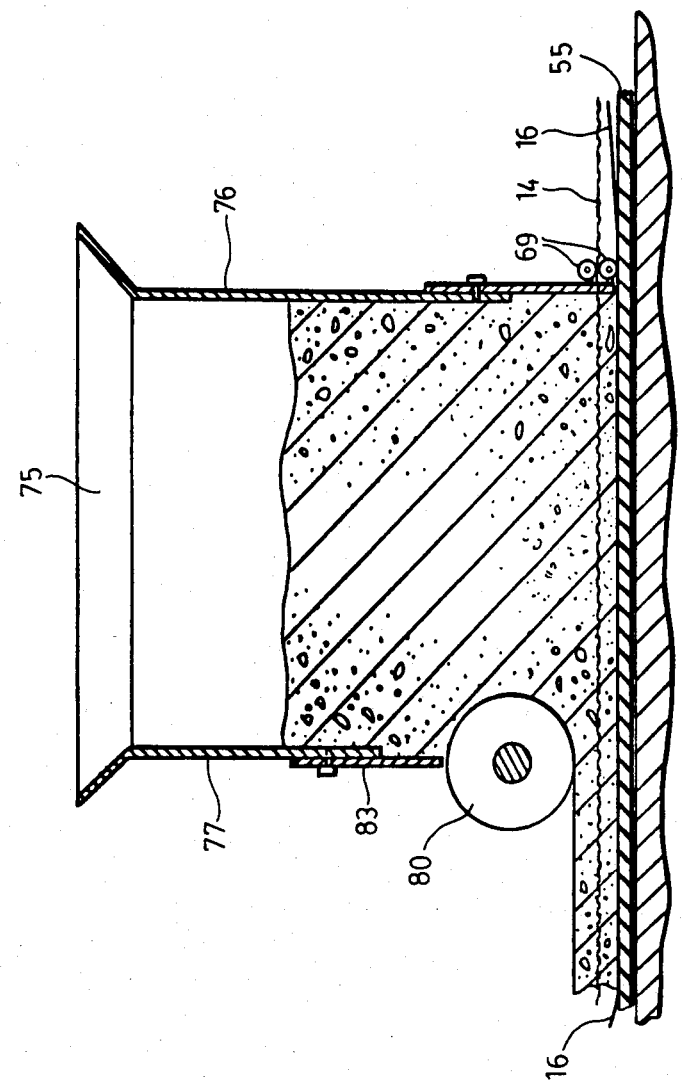
FIG. 5 is a cross section through the hopper of the apparatus showing details of the application of the concrete to a carrier tape.

The preferred pipe wrapping apparatus of the invention is shown in FIGS. 2 and 4. The apparatus comprises a frame 40 which is pivotable about a pin 41 so that the angle of application of the coating strip to the pipe 10 can be adjusted as conditions require.

Mounted on the frame 40 is a main endless belt 42 wrapped about a drive pulley 43 at the forward end of the apparatus and a rear pulley 44 which is freely rotatable and is mounted in an adjustable bracket 46 so that the belt 42 can be properly tensioned. A third freely rotatable pulley 47 is located between the drive pulley 43 and the rear pulley 44 for the purpose of supporting the belt 42 in the area beneath a roller 80 used to form the coating strip 12 just prior to wrapping. For most applications a main belt 42 having a 12 inch width is sufficient. To support the belt 42 from sagging beneath the weight of the concrete 12, a slider bed 50 is attached to the frame 40 between the pulleys 43 and 44. This slider bed 50 comprises a chamber having a plurality of holes in its top surface through which is forced air to provide a slight air cushion for the belt 42.

Figure 3A:
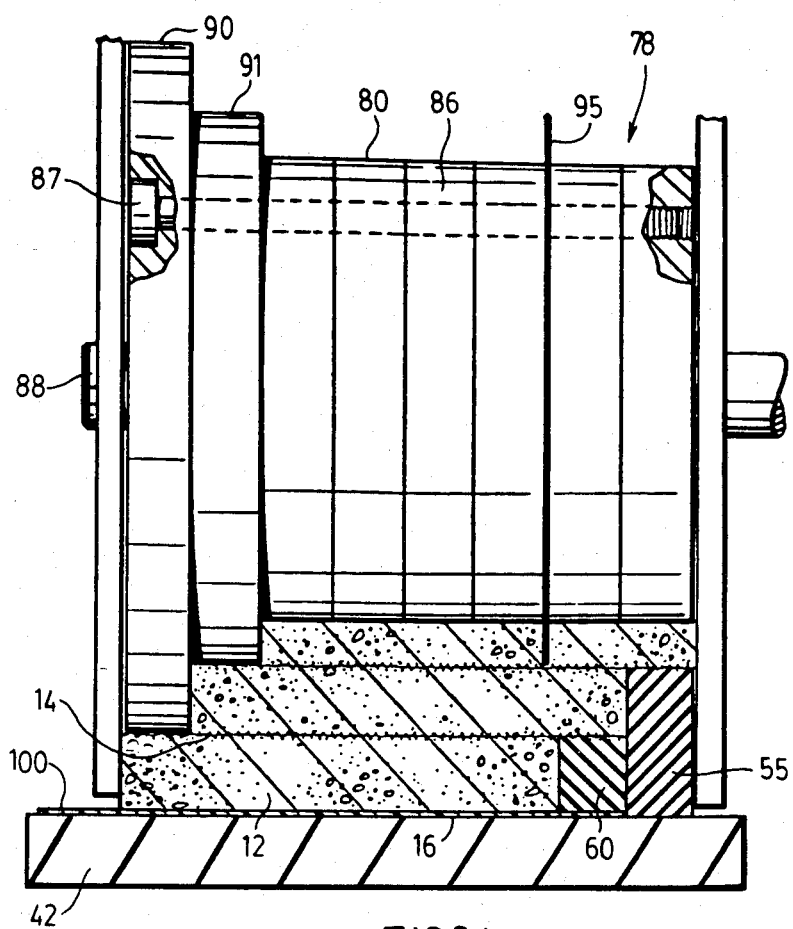
FIGS. 3A and 3B are views taken along section 3—3 of FIG. 2 showing details of two possible roller configurations for the apparatus.
Figure 3B:
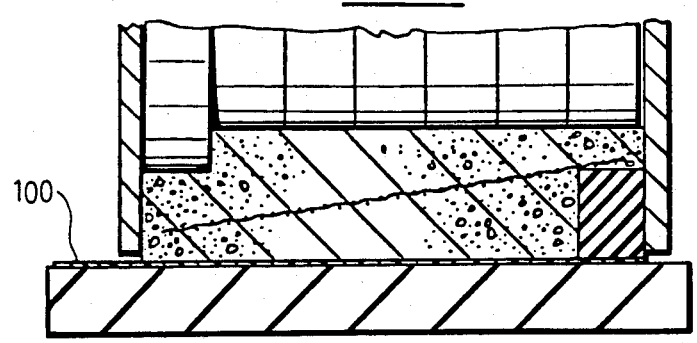

At least one endless notching belt 55 is positioned near one edge of the main belt 42 and is supported thereon. The notching belt 45 is guided by means of a forward pulley 56 positioned above the drive pulley 43 and by means of a rearward pulley 57 which is adjustable in the bracket 46 for tensioning of the belt 55. Provision is also made for a second notching belt 60 which may be positioned just inside of the notching belt 55, i.e. toward the centre of the main belt 42, or under the belt 55 to create a stepped notch in the coating strip as shown in FIG. 3A. This second notching belt 60 when used in conjunction with the notching belt 55 is guided by the forward pulley 56 and a rearward pulley 61 which is also adjustable in the bracket 46.

Located to the rear of the frame 44 is a first reel 65 for carrying a spool of carrier tape 66 which is fed over a guide roller 67 onto the main belt 42. The reel 65 is adjustable laterally (see FIG. 4) so that the tape 16 dispensed from the spool 66 can be lined up properly adjacent the innermost notching belt either 55 or 60. To the rear and above the reel 65, additional reels (not shown) are provided for one or two spools of reinforcing mesh 14 which are initially positioned over the carrier tape 16 by means of guide rollers 69.

Concrete is applied to the carrier tape 16 through a hopper 75 attached to the frame 40 and located directly over the tape 16. The hopper 75 may have adjustable sides 76 to allow for varying widths for the wrapping strip 22. The front wall 77 of the hopper 75 has an aperture 78 through which the coated strip 22 passes on its way to the pipe 10.

Positioned in the aperture 78 of the hopper 75 is a notch forming roller 80. The roller 80 is located directly over and rotates in a direction opposite to the pulley 47. The roller 80 is mounted in adjustable bearings 81 to accommodate various thicknesses for the coating material 12. The hopper 75 is provided with an adjustable gate 83 (see FIG. 5) located above the roller 80 to close off that upper portion of the aperture 78 not occupied by the roller 80. The roller 80 is driven by a motor 85 mounted on the frame 40.

As seen from FIG. 3A, the roller 80 is constructed from a plurality of disks 86 which are joined together by bolts 87. The roller 80 is mounted on an axle 88 which is supported by the adjustable bearings 81. At the end of the roller 80 opposite from the notching belts 55 and 60 (FIG. 3A) are mounted two notching disks 90 and 91 which operate to notch the concrete strip 12 in a complementary fashion to the notching accomplished by the belts 55 and 60 so that the strip 12 interlocks at the seam 20 upon wrapping of the pipe 10 (FIG. 1). Also, a mesh positioning disk 95 may be added to the roller 80 to ensure the accurate placement of the reinforcing mesh 14 in the finished strip 12. The disk 95 is thin so as to minimize the disturbance of the concrete 12, but it is also rigid so that it can act in conjunction with the notching belt 55 to position the mesh 14 at the desired location in the concrete. Clearly, the positioning disk 95 is operational only with respect to the upper layer of mesh 14 in a dual mesh system as shown in FIG. 3A, or when only one layer of mesh 14 is used. The mesh 14 may be positioned horizontally in the concrete strip 12 (FIG. 3A) to give concentric reinforcement of the coating about the pipe 10, or the mesh 14 can be positioned on an angle (FIG. 3B) in the concrete to give a noncoplanar reinforcement when wrapped about the pipe 10.

The operation of the apparatus for forming the coating strip 22 and wrapping the pipe 10 proceeds as follows. The carrier tape 16 is fed from the spool 66 onto the main belt 42 with one edge of the tape 16 abuting the inner notching belt either 55 or 60 also riding on the main belt 42 (see FIGS. 3A and 3B). The tape 16 is fed through the hopper 75 with the edge 31 away from the notching belts 35 and 60 extending beyond the hopper wall 76 so that a margin of uncoated tape 100 (FIGS. 3A and 3B) is provided for entering into the seam 30 of the wrapped pipe. The desired number of mesh strips are fed from reels (not shown) through the guide rollers 69 into the hopper 75 where they are positioned within the layer of coating concrete 12 deposited from the hopper 75 onto the tape 16 by means of the initial guide rollers 69, the notching belts 55 and 60 and the roller 80 optionally equipped with the positioning disk 95. The notching belts 55 and 60 form notches in the coating material corresponding to their heights and widths, and the roller 80 makes corresponding notches in the concrete strip 12 diagonally opposite from the notches formed by the belts 55 and 60.

The formed wrapping strip 22 proceeds from the roller 80 between the conveyor side guards 102 to the pipe 10 where it is spirally wrapped about it so that the notches formed as aforesaid overlap and interlock with the uncoated tape margin 100 overlapping the formed seam 30. The notching belts 55 and 60 support the concrete strip 12 during approximately the first quarter turn of wrapping so that the integrity of the notches formed by the belts 55 and 60 is assured (see FIG. 2). This is achieved by the arrangement of the pulley 56 located at the front of the apparatus to guide the belts 55 and 60 during the wrapping portion of the operation.

The wrapped pipe is immediately subjected to a finishing operation wherein the vibrating shoe 35 causes the concrete to flow so as to fill in the seam 20, except at the outer portion 12b of the concrete layer, and other cracks and voids which may have developed up to that stage. As shown in FIG. 2, the shoe 35 is preferably mounted pivotally on the wrapped pipe by a cylinder 106.

By wrapping the pipe 10 using the apparatus of the invention, an even layer of coating material is applied about the pipe 10 and the reinforcing mesh 14 is accurately positioned within the concrete. Since the uncoated edge of the carrier tape curls over the corresponding edge of the concrete strip 12 during wrapping, at least to the depth of the reinforcing mesh 14, the convolutions of the outer portion of the concrete helical wrap remain discrete after the concrete has set, thereby permitting limited bending of the coated pipe while protecting it from impact.

I claim:

1. A metal pipe having a protective coating consisting essentially of an inner, water-impermeable, corrosion barrier layer bonded to the pipe surface and an outer, water-permeable, concrete layer having a layer of mesh reinforcing material embedded therein, said concrete layer comprising a continuous inner portion covering the corrosion barrier layer and an outer portion which is helically slotted substantially to the depth of said reinforcing layer, the slot having axially offset inner and outer regions thereby defining a helical wrap in which adjacent convolutions overlap, said adjacent overlapping convolutions being articulately interconnected so permitting limited bending of the pipe.

2. A metal pipe according to claim 1, wherein the reinforcing layer comprises a wire mesh in which the mesh openings are bisected by longitudinally extending reinforcing wires.

3. A metal pipe according to claim 1, further comprising a tape wrapped helically around the layer of cladding material and having one longitudinal edge extending into the helical slot thereby separating said outer strip portions of adjacent convolutions.

4. A metal pipe according to claim 1, wherein the tape is of polyethylene.

5. A metal pipe according to claim 1, wherein said corrosion barrier layer is of epoxy resin fusion bonded to the surface of the pipe.

6. A metal pipe according to claim 1, wherein the concrete layer is formed as a continuous strip of concrete incorporating said mesh reinforcing material and having complementary rebated edges defining laterally offset inner and outer strip portions, the strip being wrapped helically onto the pipe with the rebated edges of adjacent convolutions overlapping, said inner strip portions of adjacent convolutions merging to form said continuous inner portion of the concrete layer and said outer strip portions of adjacent convolutions being separated to define said helical slot in the outer portion of the concrete layer.

7. A metal pipe according to claim 6, further comprising a tape wrapped helically around the concrete layer and having one longitudinal edge extending into the helical slot thereby separating said outer strip portions of adjacent convolutions.

8. A metal pipe according to claim 7, wherein the tape is of polyethylene.

9. A metal pipe according to claim 1, wherein the concrete is a lightweight concrete comprising 70–120 parts by weight lightweight aggregate, 0–30 parts by weight sand, 0–8 parts by weight pigment, 25–45 parts by weight cement, and 8–16 parts by weight water.

10. A metal pipe according to claim 9, wherein the lightweight aggregate is expanded slag.

* * * * *